(12) United States Patent
Wu et al.

(10) Patent No.: US 11,447,144 B2
(45) Date of Patent: Sep. 20, 2022

(54) METHODS FOR UPDATING AUTONOMOUS DRIVING SYSTEM, AUTONOMOUS DRIVING SYSTEMS, AND ON-BOARD APPARATUSES

(71) Applicant: UISEE TECHNOLOGIES (BEIJING) CO., LTD, Beijing (CN)

(72) Inventors: Gansha Wu, Beijing (CN); Xin Zhou, Beijing (CN); Yuxin Zhang, Beijing (CN)

(73) Assignee: UISEE TECHNOLOGIES (BEIJING) LTD., Beijing (CN)

( * ) Notice: Subject to any disclaimer, the term of this patent is extended or adjusted under 35 U.S.C. 154(b) by 0 days.

(21) Appl. No.: 17/441,238

(22) PCT Filed: May 28, 2019

(86) PCT No.: PCT/CN2019/088823
§ 371 (c)(1),
(2) Date: Sep. 20, 2021

(87) PCT Pub. No.: WO2020/186626
PCT Pub. Date: Sep. 24, 2020

(65) Prior Publication Data
US 2022/0169265 A1 Jun. 2, 2022

(30) Foreign Application Priority Data
Mar. 19, 2019 (CN) .......................... 201910207287.8

(51) Int. Cl.
*B60W 50/02* (2012.01)
*B60W 60/00* (2020.01)
(Continued)

(52) U.S. Cl.
CPC .... *B60W 50/0205* (2013.01); *B60W 60/0053* (2020.02); *G06F 8/65* (2013.01);
(Continued)

(58) Field of Classification Search
USPC ...................................................... 701/30.4
See application file for complete search history.

(56) References Cited

U.S. PATENT DOCUMENTS

| 10,239,538 B1* | 3/2019 | Fields .................. G05D 1/0088 |
| 2019/0009794 A1* | 1/2019 | Toyoda .................. B60W 50/12 |
| 2019/0018412 A1 | 1/2019 | Tschanz et al. |

FOREIGN PATENT DOCUMENTS

| CN | 102982316 A | 3/2013 |
| CN | 104391504 A | 3/2015 |

(Continued)

OTHER PUBLICATIONS

China National Intellectual Property Administration, International Search Report, dated Nov. 20, 2019, 5 pages.
China National Intellectual Property Administration, International Preliminary Report on Patentability, dated Sep. 16, 2021, 9 pages.
China National Intellectual Property Administration, Written Opinion, dated Nov. 20, 2019, 7 pages.
(Continued)

*Primary Examiner* — Tyler D Paige
(74) *Attorney, Agent, or Firm* — MagStone Law, LLP; Enshan Hong

(57) ABSTRACT

Embodiments of the present disclosure relate to methods for updating an autonomous driving system, autonomous driving systems, and on-board apparatuses. In the embodiments of the present disclosure, the autonomous driving system, in a manual driving mode, senses the surrounding environment of a vehicle, performs vehicle positioning, and generates an autonomous control instruction for an underlying vehicle execution system. However, the autonomous driving system does not issue an instruction to control the driving of the vehicle. Instead, it compares the instruction with a control instruction from the driver of the vehicle for the underlying vehicle execution system in the manual driving mode to
(Continued)

update a planning and control algorithm of the autonomous driving system. As such, the updated autonomous driving system better caters to the driving habits of the driver and improves the driving experience for the driver without compromising the reliability of planning and decision-making of autonomous driving.

15 Claims, 2 Drawing Sheets

(51) Int. Cl.
*G06F 8/65* (2018.01)
*G07C 5/00* (2006.01)
*B60W 50/00* (2006.01)

(52) U.S. Cl.
CPC ..... *G07C 5/008* (2013.01); *B60W 2050/0083* (2013.01); *B60W 2050/0215* (2013.01); *B60W 2420/42* (2013.01); *B60W 2420/52* (2013.01); *B60W 2520/10* (2013.01); *B60W 2520/105* (2013.01); *B60W 2520/28* (2013.01); *B60W 2540/18* (2013.01); *B60W 2540/30* (2013.01); *B60W 2556/10* (2020.02); *B60W 2556/60* (2020.02)

(56) References Cited

FOREIGN PATENT DOCUMENTS

| | | |
|---|---|---|
| CN | 106394559 A | 2/2017 |
| CN | 107200017 A | 9/2017 |
| CN | 107223103 A | 9/2017 |
| CN | 108508881 A | 9/2018 |
| DE | 102013205840 A1 | 10/2014 |
| JP | 2017087906 A | 5/2017 |
| WO | 2017057060 A1 | 4/2017 |

OTHER PUBLICATIONS

China National Intellectual Property Administration, First Office Action, dated Jan. 7, 2020, 18 pages.
China National Intellectual Property Administration, First Search, dated Dec. 24, 2019, 4 pages.
China National Intellectual Property Administration, Second Office Action, dated Oct. 13, 2020, 18 pages.
Wang et al., Progress of Research on the Application of Deep Learning in the Field of Autonomous Vehicle, CAAI Transactions on Intelligent Systems, Jun. 26, 2017, 55-69, vol. 13, China Association for Artificial Intelligence, China.
Japanese Application No. JP2021-552194, Office Action dated Feb. 8, 2022, 5 pages.

* cited by examiner

METHODS FOR UPDATING AUTONOMOUS DRIVING SYSTEM, AUTONOMOUS DRIVING SYSTEMS, AND ON-BOARD APPARATUSES

CROSS-REFERENCE TO RELATED APPLICATIONS

The present application is a national phase application of International Application No. PCT/CN2019/088823, filed May 28, 2019, which claims the priority to Chinese Patent Application No. 201910207287.8 entitled "METHODS FOR UPDATING AUTONOMOUS DRIVING SYSTEM, AUTONOMOUS DRIVING SYSTEMS, AND ON-BOARD APPARATUSES," filed at China Patent Office on Mar. 19, 2019, each of which is incorporated herein by reference in its entirety.

TECHNICAL FIELDS

Embodiments of the present disclosure relate to the technical field of autonomous driving, and in particular to methods for updating an autonomous driving system, autonomous driving systems, and on-board apparatuses.

BACKGROUND

Existing autonomous vehicles provide a variety of vehicle driving modes, such as a manual driving mode, an assisted driving mode and an autonomous driving mode. The manual driving mode corresponds to Level 0 autonomy. The assisted driving mode corresponds to Level 1 autonomy. The autonomous driving mode corresponds to Level 2 to Level 5 autonomy. The autonomous driving mode is a mode in which an autonomous driving system of an autonomous vehicle conducts planning and control for autonomous driving of the autonomous vehicle. In the manual driving mode, the autonomous driving system is in an inactive state and does not operate. In the autonomous driving mode, the autonomous driving system is in an active state.

Since different drivers may have different driving habits, an autonomous driving system should be updated according to the driving habits of a driver without compromising the reliability of the planning and decision-making of autonomous driving, to cater to the driving habits of the driver and improve the driving experience for the driver.

SUMMARY

In order to solve the problems existing in the prior art, at least one embodiment of the present disclosure provides methods for updating an autonomous driving system, autonomous driving systems, and on-board apparatuses.

In a first aspect, an embodiment of the present disclosure provides a method for updating an autonomous driving system that issues no instruction to control the driving of a vehicle in a manual driving mode. The method includes:
acquiring a first control instruction in the manual driving mode from an underlying vehicle execution system;
acquiring data of a first sensor group and data of a second sensor group;
generating environment sensing information and positioning information according to the data of the first sensor group;
generating a second control instruction for the underlying vehicle execution system in an autonomous driving mode according to the environment sensing information, the positioning information, and the data of the second sensor group; and
updating the autonomous driving system according to the first control instruction and the second control instruction.

In some embodiments, the first sensor group includes a camera, a lidar, a millimeter wave radar, a GPS and/or an IMU; and
the second sensor group includes a wheel speed sensor, a speed sensor, an acceleration sensor and/or a steering angle sensor.

In some embodiments, updating the autonomous driving system according to the first control instruction and the second control instruction includes:
determining a difference in control information according to the first control instruction and the second control instruction;
determining a driving behavior grade in the manual driving mode according to the first control instruction and the data of at least one sensor of the second sensor group; and
updating the autonomous driving system according to the difference and the driving behavior grade.

In some embodiments, determining the driving behavior grade in the manual driving mode according to the first control instruction and the data of at least one sensor of the second sensor group includes:
sending the first control instruction and the data of the second sensor group to a cloud server; and
receiving the driving behavior grade from the cloud server.

In some embodiments, updating the autonomous driving system according to the difference and the driving behavior grade includes:
determining a correspondence if the difference is greater than a preset difference threshold and the driving behavior grade is a first grade; and
updating a planning and control algorithm of the autonomous driving system according to the correspondence,
wherein the correspondence indicates that the environment sensing information, the positioning information, and the data of the second sensor group correspond to the first control instruction, and wherein the autonomous driving system generates a control instruction for the underlying vehicle execution system in the autonomous driving mode as the first control instruction according to the environment sensing information, the positioning information, the data of the second sensor group, and the correspondence.

In some embodiments, the method further includes:
identifying abnormal data in the data of the second sensor group;
to avoid the occurrence of the abnormal data, determining dynamics estimation data and an estimated time corresponding to the dynamics estimation data;
determining a third control instruction for the underlying vehicle execution system according to the dynamics estimation data;
determining, according to the estimated time, historical environment sensing information and historical positioning information generated at the estimated time; and
establishing a correspondence indicating that the historical environment sensing information and the historical positioning information correspond to the third control instruction.

In a second aspect, an embodiment of the present disclosure further provides an autonomous driving system that issues no instruction to control the driving of a vehicle in a manual driving mode. The autonomous driving system includes:

a first acquisition unit configured to acquire a first control instruction in the manual driving mode from an underlying vehicle execution system;

a second acquisition unit configured to acquire data of a first sensor group and data of a second sensor group;

a first generation unit configured to generate environment sensing information and positioning information according to the data of the first sensor group;

a second generation unit configured to generate a second control instruction for the underlying vehicle execution system in an autonomous driving mode according to the environment sensing information, the positioning information, and the data of the second sensor group; and an updating unit configured to update the autonomous driving system according to the first control instruction and the second control instruction.

In some embodiments, the first sensor group includes a camera, a lidar, a millimeter wave radar, a GPS and/or an IMU; and the second sensor group includes a wheel speed sensor, a speed sensor, an acceleration sensor and/or a steering angle sensor.

In some embodiments, the updating unit includes:

a first subunit configured to determine a difference in control information according to the first control instruction and the second control instruction;

a second subunit configured to determine a driving behavior grade in the manual driving mode according to the first control instruction and the data of at least one sensor of the second sensor group; and a third subunit configured to update the autonomous driving system according to the difference and the driving behavior grade.

In some embodiments, the second subunit is configured to:

send the first control instruction and the data of the second sensor group to a cloud server; and receive the driving behavior grade from the cloud server.

In some embodiments, the third subunit is configured to:

determine a correspondence if the difference is greater than a preset difference threshold and the driving behavior grade is a first grade; and update a planning and control algorithm of the autonomous driving system according to the correspondence, wherein the correspondence indicates that the environment sensing information, the positioning information, and the data of the second sensor group correspond to the first control instruction, and wherein the autonomous driving system generates a control instruction for the underlying vehicle execution system in the autonomous driving mode as the first control instruction according to the environment sensing information, the positioning information, the data of the second sensor group and the correspondence.

In some embodiments, the autonomous driving system further includes a reverse analysis unit configured to:

identify abnormal data in the data of the second sensor group;

to avoid the occurrence of the abnormal data, determine dynamics estimation data and an estimated time corresponding to the dynamics estimation data;

determine a third control instruction for the underlying vehicle execution system according to the dynamics estimation data;

determine, according to the estimated time, historical environment sensing information and historical positioning information generated at the estimated time; and establish a correspondence indicating that the historical environment sensing information and the historical positioning information correspond to the third control instruction.

In a third aspect, an embodiment of the present disclosure further provides an on-board apparatus, including:

a processor, a memory and a communication interface, wherein the processor, the memory, and the communication interface are coupled to one another through a bus system; and wherein the processor is configured to perform the steps of the method of the first aspect by executing a computer program stored in the memory.

As shown, in at least one of the embodiments of the present disclosure, in a manual driving mode, the autonomous driving system also senses the surrounding environment of a vehicle, performs vehicle positioning, and generates an autonomous control instruction for an underlying vehicle execution system according to environment sensing information, positioning information, and data of vehicle sensors. However, the autonomous driving system does not issue an instruction to control the driving of the vehicle. Instead, it compares the instruction with a control instruction from the driver of the vehicle for the underlying vehicle execution system in the manual driving mode to update a planning and control algorithm of the autonomous driving system, such that the updated autonomous driving system better caters to the driving habits of the driver and improves driving experience for the driver without compromising the reliability of planning and decision-making of autonomous driving.

BRIEF DESCRIPTION OF DRAWINGS

In order to illustrate more clearly embodiments of the present disclosure, the drawings used in description of the embodiments will be briefly described below. Obviously, the drawings in the following description only describe some embodiments of the present disclosure. For those of ordinary skill in the art, other drawings can be derived on the basis of these drawings without any inventive effort.

DETAILED DESCRIPTION

In order to better understand the above objects, features and advantages of the present disclosure, the present disclosure will be further is described in detail with reference to the drawings and embodiments. It can be understood that the embodiments described herein are only some of but not all embodiments of the present disclosure. The particular embodiments described herein are only used to explain the present disclosure and are not intended to limit the present disclosure. All other embodiments derived by those of ordinary skill in the art based on the described embodiments of the present disclosure fall within the scope of protection of the present disclosure.

It should be noted that the relative terms herein, such as "first" and "second", are used only to distinguish one entity or operation from another entity or operation, without necessarily requiring or implying any such actual relationship or sequence between these entities or operations.

Figure 1:
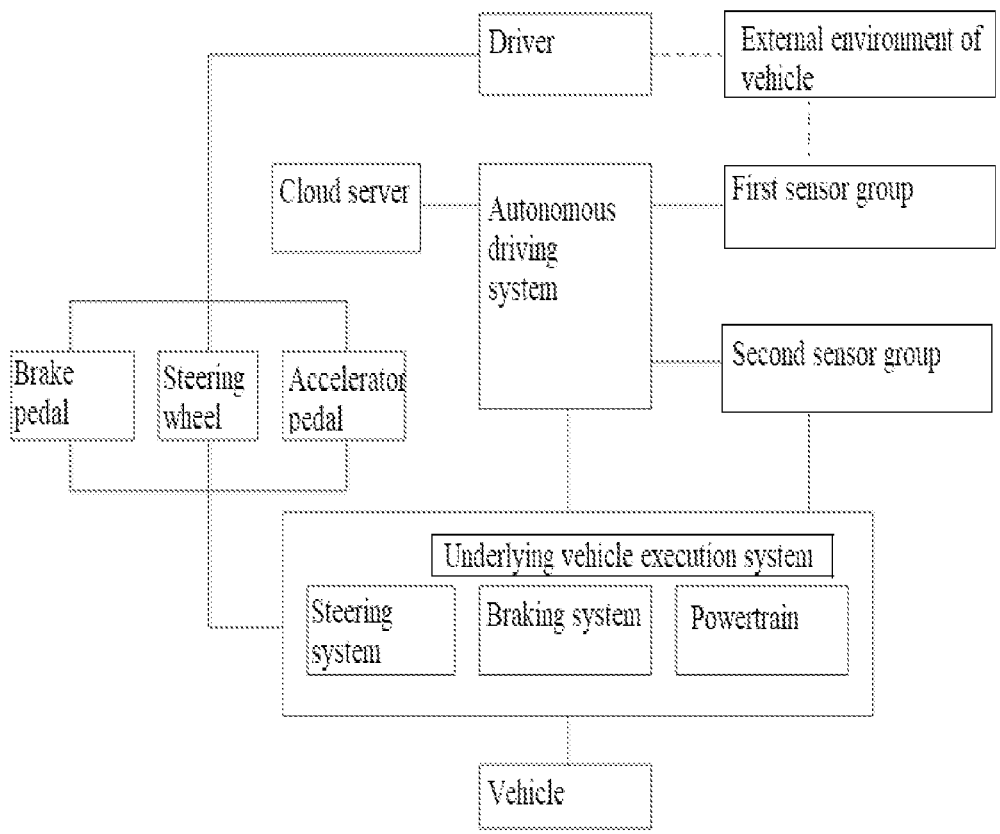
FIG. 1 is a diagram of a general architecture of an autonomous vehicle in accordance with an embodiment of the present disclosure.

FIG. 1 is a diagram of a general architecture of an autonomous vehicle in accordance with an embodiment of the present disclosure. As shown in FIG. 1, data collected by a first sensor group may include but are not limited to data of the external environment and position data of the vehicle. As an example, the first sensor group may include but is not limited to at least one of a camera, a lidar, a millimeter wave radar, a global positioning system (GPS) and an inertial measurement unit (IMU). The autonomous driving system can acquire the data of the first sensor group.

The data collected by the second sensor group may include but are not limited to the dynamics data of the vehicle. As an example, the second sensor group may include but is not limited to at least one of a wheel speed sensor, a speed sensor, an acceleration sensor, and a steering angle sensor. The autonomous driving system can acquire the data of the second sensor group.

In a manual driving mode, a driver drives the vehicle by operating the is devices for controlling the driving of the vehicle. As an example, the devices for controlling the driving of the vehicle may include but are not limited to a brake pedal, a steering wheel and an accelerator pedal. The devices for controlling the driving of the vehicle can directly operate an underlying vehicle execution system to control the driving of the vehicle. The underlying vehicle execution system may control the driving of the vehicle. The underlying vehicle execution system may include a steering system, a braking system, and a powertrain.

The autonomous driving system may be a software system running on an operating system. An on-board hardware system may be a hardware system supporting the operations of the operating system. The autonomous driving system may make planning and decisions for autonomous driving of the vehicle according to a planning and control algorithm The autonomous driving system can communicate and exchange various information with a cloud server wirelessly.

The autonomous driving system issues no instruction to control the driving of a vehicle in a manual driving mode. The autonomous driving system can realize the steps of embodiments of methods for updating an autonomous driving system. The steps may include, for example, steps I to V as shown below:

I. acquiring a first control instruction in the manual driving mode from an underlying vehicle execution system;

II. acquiring data of a first sensor group and data of a second sensor group;

III. generating environment sensing information and positioning information according to the data of the first sensor group;

IV. generating a second control instruction for the underlying vehicle execution system in an autonomous driving mode according to the environment sensing information, the positioning information, and the data of the second sensor group; and V. updating the autonomous driving system according to the first control instruction and the second control instruction.

In the manual driving mode, the autonomous driving system also senses the surrounding environment of the vehicle, performs vehicle positioning, and generates an autonomous control instruction for an underlying vehicle execution system according to environment sensing information, positioning information, and data of vehicle sensors. However, the autonomous driving system does not issue an instruction to control the driving of the vehicle. Instead, it compares the instruction with a control instruction from the driver of the vehicle for the underlying vehicle execution system in the manual driving mode to update a planning and control algorithm of the autonomous driving system. As such, the updated autonomous driving system better caters to the driving habits of the driver, which may improve the driving experience for the driver without compromising the reliability of planning and decision-making of autonomous driving.

Figure 2:
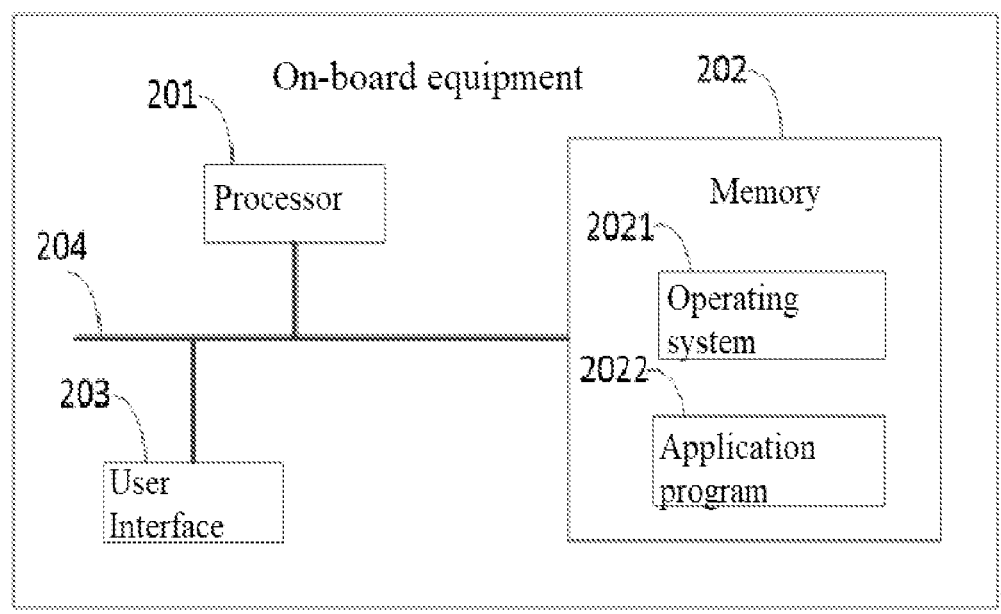
FIG. 2 is a schematic diagram of an on-board apparatus in accordance with an embodiment of the present disclosure.

FIG. 2 is a schematic diagram of an on-board apparatus in accordance with an embodiment of the present disclosure.

The on-board apparatus shown in FIG. 2 may include at least a processor 201, memory 202, and a user interface 203. The various components of the on-board apparatus are coupled to one another through a bus system 204. It can be understood that the bus system 204 may be configured to facilitate connection and communication between these components. The bus system 204 may include a power bus, a control bus and a status signal bus in addition to a data bus. However, for clarity of illustration, various buses are generally labeled as the bus system 204 in is FIG. 2.

The user interface 203 may include a display, a keyboard, or a pointing device (e.g., a mouse, a trackball, a touch pad, etc.).

It can be understood that the memory 202 in this embodiment may be a volatile memory or a nonvolatile memory or may include both volatile and nonvolatile memories. The nonvolatile memory may be a read-only memory (ROM), a programmable ROM (PROM), an erasable PROM (EPROM), an electrically erasable PROM (EEPROM) or a flash memory. The volatile memory may be a random-access memory (RAM), which is used as an external cache. By way of example but not limitation, many forms of RAM may be used, such as a static RAM (SRAM), a dynamic RAM (DRAM), synchronous DRAM (SDRAM), a double data rate SDRAM (DDRSDRAM), an enhanced SDRAM (ESDRAM), a synchlink DRAM (SLDRAM) and a direct Rambus RAM (DRRAM). The memory 202 described herein is intended to include, but is not limited to, these and any other suitable types of memory.

In some embodiments, the memory 202 may store the following elements, executable units or data structures, or a subset or superset thereof: an operating system 2021 and an application program 2022.

The operating system 2021 may include various system programs, such as a framework layer, a core library layer and a drive layer, to implement various basic services and handle hardware-based tasks. The application program 2022 may include various application programs, such as a media player and a browser, to implement various application services. A program implementing a method of the embodiments of the present disclosure may be included in the application program 2022.

In an embodiment of the present disclosure, the processor 201 may be configured to execute a program or instructions stored in the memory 202, is particularly the program or instructions stored in the application program 2022, to perform the steps of a method for updating an autonomous driving system in accordance with some embodiments. The steps may include, for example, steps I to V as shown below:

I. acquiring a first control instruction in the manual driving mode from an underlying vehicle execution system;

II. acquiring data of a first sensor group and data of a second sensor group;

III. generating environment sensing information and positioning information according to the data of the first sensor group;

IV. generating a second control instruction for the underlying vehicle execution system in an autonomous driving mode according to the environment sensing information, the positioning information, and the data of the second sensor group; and V. updating the autonomous driving system according to the first control instruction and the second control instruction.

The method disclosed in the above embodiment of the present disclosure can be applied to the processor 201 or implemented by the processor 201. The processor 201 may be an integrated circuit chip with signal processing capability. In the implementation process, each step of the above method can be performed by an integrated logic circuit of hardware in the processor 201 or instructions in the form of software. The above-mentioned processor 201 may be a general-purpose processor, a digital signal processor (DSP), an application specific integrated circuit (ASIC), a field programmable gate array (FPGA) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor. The steps of the method disclosed in connection with the embodiments of the present disclosure can be directly embodied as implementation by a hardware decoding processor, or by a combination of hardware and software units of the decoding processor. The software unit can be located in a sophisticated storage medium in the art such as a random-access memory, a flash memory, a read-only memory, a programmable read-only memory or electrically erasable programmable memory, a register, etc. The storage medium is located in the memory 202, and the processor 201 reads the information in the memory 202 and performs the steps of the above method in combination with its hardware.

It can be understood that the embodiments described herein can be implemented in hardware, software, firmware, middleware, microcode, or a combination thereof. For hardware implementation, the processing unit may be implemented in one or more application specific integrated circuits (ASICs), digital signal processors (DSPs), digital signal processing devices (DSPDs), programmable logic devices (PLDs), field programmable gate arrays (FPGAs), general-purpose processors, controllers, microcontrollers, microprocessors, other electronic units for implementing the functions described herein, or combinations thereof.

For software implementation, the technique scheme described herein may be implemented by units that perform the functions described herein. Software codes may be stored in memory and executed by a processor. The memory may be implemented in the processor or external to the processor.

Those of ordinary skill in the art can realize that the units and algorithm steps of each example described in connection with the embodiments disclosed herein can be implemented in electronic hardware, or a combination of computer software and electronic hardware. Whether these functions are implemented in hardware or software depends on the specific application and design constraints of the technical scheme. Specialized technicians can use different methods to implement the described functions for each specific application, but such implementation should not be considered beyond the scope of the present disclosure.

Those skilled in the art can clearly understand that for convenience and conciseness of description, the specific working processes of the above-described systems, devices and units can refer to the corresponding processes in the above-described embodiments of the method and will not be further described here.

In the embodiments provided in this application, it should be understood that the execution order can be adjusted arbitrarily unless there is an expressly stated order between the steps of the methods. The disclosed device and method can be realized in alternative ways. For example, the apparatus embodiments described above are only for illustration. For example, the division of the units is only a logic function division. In actual implementation, there may be other division methods, for example, multiple units or assemblies may be combined or integrated into another system, or some features may be omitted or not implemented. Further, the mutual coupling or direct coupling or communication connection shown or discussed may be indirect coupling or communication connection through some interfaces, devices or units, and may be in electrical, mechanical or other forms.

The units described as separate components may or may not be physically separated, and the components displayed as units may or may not be physical units, that is, they may be located in one place or distributed to multiple network units. Some or all of the units can be is selected according to actual needs to achieve the purpose of the embodiment.

In addition, the functional units in each embodiment of the present disclosure may be integrated into one processing unit, or each unit may physically exist separately, or two or more units may be integrated into one unit.

If the functions are implemented in the form of functional units of software and sold or used as independent products, they can be stored in a computer-readable storage medium. On the basis of this understanding, the substance or the parts that contribute to the existing technology or a part of the technical schemes of the present disclosure may be embodied in the form of a software product, which is stored in a storage medium and includes a number of instructions to cause a computer device (which can be a personal computer, a server, or a network device, etc.) to execute all or part of the steps of the method described in the embodiments of the present disclosure. The aforementioned storage medium includes USB drive, mobile hard disk drive, ROM, RAM, magnetic disk or optical disk and other mediums that can store program codes.

Figure 3:
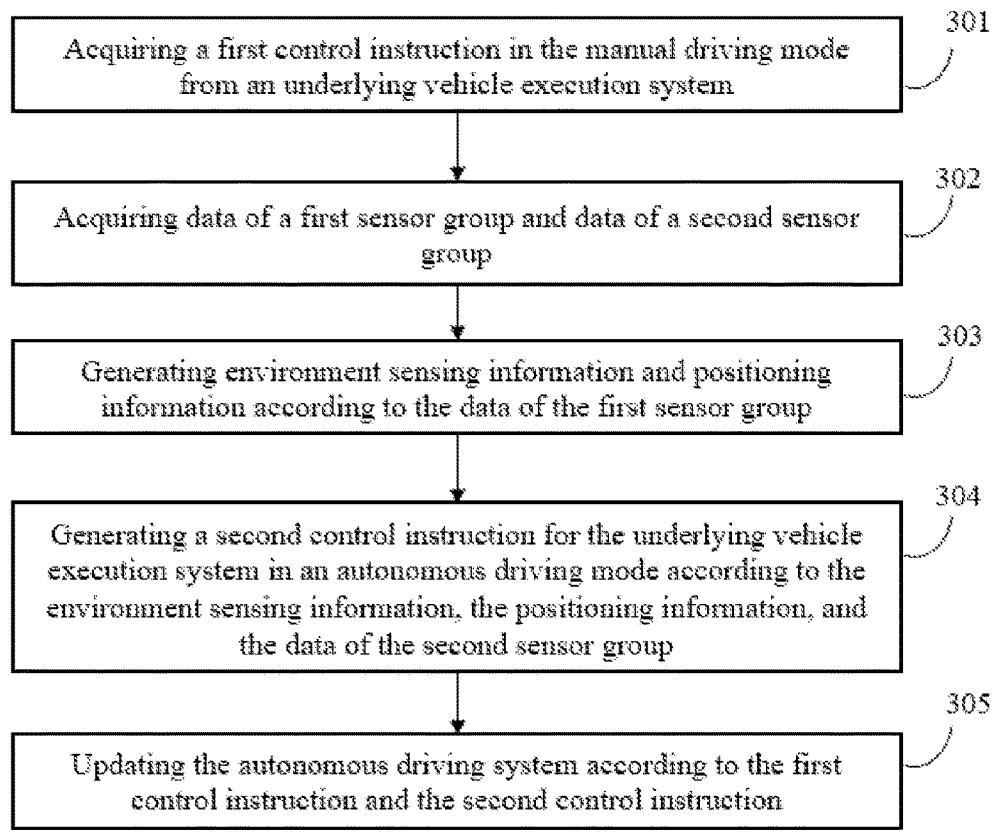
FIG. 3 is a flowchart of a method for updating an autonomous driving system in accordance with an embodiment of the present disclosure.

FIG. 3 is a flowchart of a method for updating an autonomous driving system in accordance with an embodiment of the present disclosure. The method may be performed by an on-board apparatus.

As shown in FIG. 3, according to a method for updating an autonomous driving system disclosed in this embodiment, the autonomous driving system issues no instruction to control the driving of a vehicle in a manual driving mode. The method may include the following steps 301 to 305:

301. acquiring a first control instruction in the manual driving mode from an underlying vehicle execution system;

302. acquiring data of a first sensor group and data of a second sensor group;

303. generating environment sensing information and positioning information according to the data of the first sensor group;

304. generating a second control instruction for the underlying vehicle execution system in an autonomous driving mode according to the environment sensing information, the positioning information, and the data of the second sensor group; and 305. updating the autonomous driving system according to the first control instruction and the second control instruction.

In this embodiment, in a manual driving mode, a driver drives the vehicle by operating devices for controlling the driving of the vehicle. As an example, the devices for controlling the driving of the vehicle may include but are not limited to a brake pedal, a steering wheel, and an accelerator pedal. The devices for controlling the driving of the vehicle can directly operate an underlying vehicle execution system to control the driving of the vehicle. The underlying vehicle execution system may control the driving of the vehicle, and the underlying vehicle execution system may include a steering system, a braking system, and a powertrain.

When the driver drives the vehicle, the autonomous driving system can acquire the data of the first sensor group. The data collected by the first sensor group may include but are not limited to data of the external environment and position data of the vehicle. As an example, the first sensor group may include but is not limited to at least one of a camera, a lidar, a millimeter wave radar, a global positioning system (GPS) and an inertial measurement unit (IMU). The autonomous driving system can acquire the data of the first sensor group.

Therefore, the autonomous driving system can generate environment is sensing information and positioning information based on the data of the first sensor group. Specifically, the autonomous driving system may generate environment sensing information and positioning information based on the sensing data and positioning data.

When the driver drives the vehicle, the autonomous driving system can also acquire the data of the second sensor group. The data collected by the second sensor group may include but are not limited to the dynamics data of the vehicle. As an example, the second sensor group may include but is not limited to at least one of a wheel speed sensor, a speed sensor, an acceleration sensor, and a steering angle sensor.

Therefore, the autonomous driving system can generate a second control instruction for the underlying vehicle execution system in an autonomous driving mode according to the environment sensing information, the positioning information, and the data of the second sensor group. Specifically, the autonomous driving system may make planning and decisions according to the environment sensing information, positioning information, and dynamics data, to generate the second control instruction for the underlying vehicle execution system.

In the manual driving mode, the autonomous driving system also senses the surrounding environment of a vehicle, performs vehicle positioning, and generates an autonomous control instruction for an underlying vehicle execution system according to environment sensing information, positioning information, and data of vehicle sensors. However, the autonomous driving system does not issue an instruction to control the driving of the vehicle. Instead, it compares the instruction with a control instruction from the driver of the vehicle for the underlying vehicle execution system in the manual driving mode to update a planning and control algorithm of the autonomous driving system. As such, the updated autonomous driving system better caters to the driving habits of the driver and improves the driving experience for the driver without compromising the reliability of planning and decision-making of autonomous driving.

In some embodiments, updating the autonomous driving system according to the first control instruction and the second control instruction in step 305 may include the following steps (1) to (3):

(1) determining a difference in control information according to the first control instruction and the second control instruction;

(2) determining a driving behavior grade in the manual driving mode according to the first control instruction and the data of at least one sensor of the second sensor group; and (3) updating the autonomous driving system according to the difference and the driving behavior grade.

In this embodiment, the autonomous driving system can determine the control information corresponding to the first control instruction and the control information corresponding to the second control instruction. For example, the control instruction is turning a steering wheel and the control information corresponding to the control instruction is a steering wheel angle. Therefore, the autonomous driving system can determine the difference in control information between the first control instruction and the second control instruction.

Since the first control instruction is a control instruction from the driver who drives the vehicle, and the data of the second sensor group include vehicle dynamics data, which can reflect the driving state of the vehicle, it can be determined whether the driver's driving behavior is abnormal according to the first control instruction and the data of at least one sensor in the second sensor group. For example, if the vehicle has experienced abnormal events such as sharp turning, emergency braking and is fast overtaking, it means that the driver's behavior is abnormal.

In this embodiment, the driving behavior grade in the manual driving mode may be used to evaluate whether the driver's behavior is abnormal. The first grade of driving behavior may indicate no abnormality, and the second grade of driving behavior may indicate abnormality. In specific applications, different grades can be used to express different degrees of how well or how badly a driver behaves.

After the difference in control information between the first control instruction and the second control instruction and the driving behavior grade are determined, it can be determined whether to update the planning and control algorithm of the autonomous driving system.

If the driver's behavior is abnormal, no update may be performed. If the driver's behavior is not abnormal, an update may be performed, so that the decision-making and planning of the autonomous driving system based on the updated planning and control algorithm better caters to the driver's habits and improves the driving experience for the driver.

Based on the previous embodiment, determining a driving behavior grade in the manual driving mode according to the first control instruction and the data of at least one sensor of the second sensor group may include the following steps (1) and (2):

(1) sending the first control instruction and the data of the second sensor group to a cloud server; and (2) receive the driving behavior grade from the cloud server.

In this embodiment, the autonomous driving system may send the first control instruction and the data of the second sensor group to the cloud server, and the cloud server may be responsible for determining the driving behavior grade.

The cloud server may determine the driving behavior grade and then may send it to the autonomous driving system to reduce the workload of the autonomous driving system.

In addition, the processing capacity of the cloud server may be much greater than that of the on-board hardware devices on which the autonomous driving system depends. It can determine the driving behavior grade faster and meet the real-time requirements of the autonomous driving system.

In this embodiment, since the first control instruction may be a control instruction from the driver who drives the vehicle, and the data of the second sensor group may include vehicle dynamics data, which can reflect the driving state of the vehicle, the cloud server can determine whether the driver's driving behavior is abnormal according to the first control instruction and the data of at least one sensor in the second sensor group. For example, if the vehicle has experienced abnormal events such as a sharp turning, emergency braking and quick overtaking, it means that the driver's behavior is abnormal.

In addition, if the cloud server determines that the driver's behavior is abnormal, a log file may be generated and stored for the driver or other professionals to check and analyze.

In some embodiments, updating the autonomous driving system according to the difference and the driving behavior grade may include the following steps (1) and (2):

(1) determine a correspondence if the difference is greater than a preset difference threshold and the driving behavior grade is a first grade; and (2) updating a planning and control algorithm of the autonomous driving system according to the correspondence, wherein the correspondence indicates that the environment sensing information, the positioning information, and the data of the second sensor group correspond to the first control instruction, and wherein the autonomous driving system generates a control instruction for the underlying vehicle execution system in the autonomous driving mode as the first control instruction according to the environment sensing information, the positioning information, the data of the second sensor group and the correspondence.

In this embodiment, the difference threshold may indicate that the second control instruction generated by the autonomous driving system is considerably different from the first control instruction from the driver who controls the vehicle and therefore does not conform to the operating habits of the driver.

If the difference is greater than the difference threshold and the driving behavior grade is the first grade (that is, the driver's behavior is not abnormal), the planning and control algorithm of the autonomous driving system may be updated, such that the updated autonomous driving system better caters to the driving habits of the driver and improves the driving experience for the driver without compromising the reliability of the planning and decision-making of autonomous driving.

If the difference is less than or equal to the difference threshold, the second control instruction generated by the autonomous driving system may not be much different from the first control instruction from the driver to control the vehicle and therefore conforms to the driver's operating habits and no update may be needed.

In some embodiments, the method for updating an autonomous driving system may further include a reverse analysis process, which specifically includes the following steps (1) to (5):

(1) identifying abnormal data in the data of the second sensor group;

(2) to avoid the occurrence of the abnormal data, determining is dynamics estimation data and an estimated time corresponding to the dynamics estimation data;

(3) determining a third control instruction for the underlying vehicle execution system according to the dynamics estimation data;

(4) determining, according to the estimated time, historical environment sensing information and historical positioning information generated at the estimated time; and (5) establishing a correspondence indicating that the historical environment sensing information and the historical positioning information correspond to the third control instruction.

In this embodiment, the abnormal data can be understood as abnormal data corresponding to abnormal events such as sharp turning, emergency braking, and fast overtaking.

To avoid the occurrence of the abnormal data by determining the dynamics estimation data and the estimated time corresponding to the dynamics estimation data, the third control instruction for the underlying vehicle execution system corresponding to the dynamics estimation data and the historical environment sensing information and historical positioning information generated at the estimated time can be determined.

By establishing a correspondence indicating that the historical environment sensing information and the historical positioning information correspond to the third control instruction, the autonomous driving system may generate the third control instruction to avoid the occurrence of abnormal events if the autonomous driving system determines that environmental sensing information is the historical environment sensing information and positioning information is the historical positioning information during autonomous driving.

Figure 4:
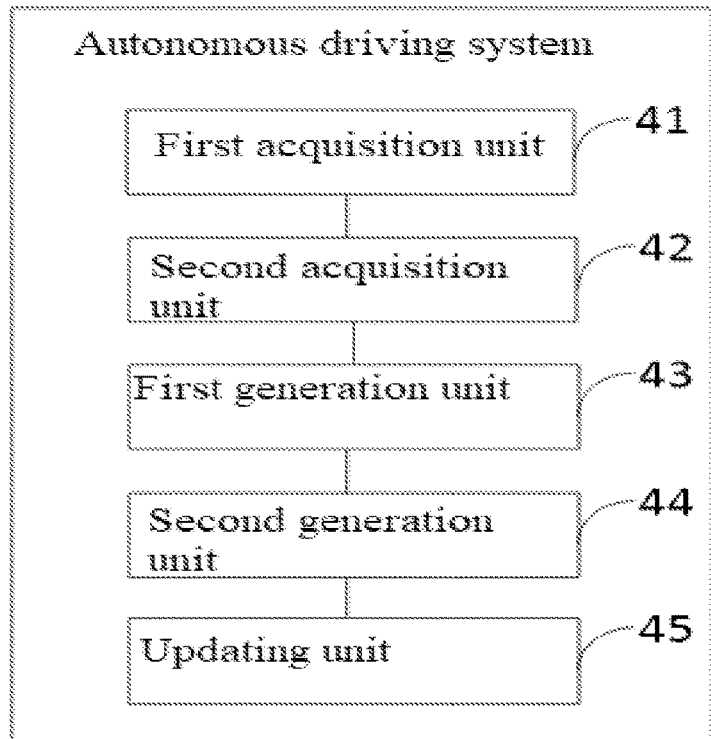
FIG. 4 is a block diagram of an autonomous driving system in accordance with an embodiment of the present disclosure.

As shown in FIG. 4, this embodiment discloses an autonomous driving system that issues no instruction to control the driving of a vehicle in a manual driving mode. The autonomous driving system may include a first acquisition unit 41, a second acquisition unit 42, a first generation unit 43, a second generation unit 44, and an updating unit 45, which are detailed below.

The first acquisition unit 41 is configured to acquire a first control instruction in the manual driving mode from an underlying vehicle execution system.

The second acquisition unit 42 is configured to acquire data of a first sensor group and data of a second sensor group.

The first generation unit 43 is configured to generate environment sensing information and positioning information according to the data of the first sensor group.

The second generation unit 44 is configured to generate a second control instruction for the underlying vehicle execution system in an autonomous driving mode according to the environment sensing information, the positioning information, and the data of the second sensor group.

The updating unit 45 is configured to update the autonomous driving system according to the first control instruction and the second control Instruction.

In some embodiments, the first sensor group may include a camera, a lidar, a millimeter wave radar, a GPS and/or an IMU; and the second sensor group may include a wheel speed sensor, a speed sensor, an acceleration sensor and/or a steering angle sensor.

In some embodiments, the updating unit 45 may include:
a first subunit configured to determine a difference in control information according to the first control instruction and the second control instruction;
a second subunit configured to determine a driving behavior grade in the manual driving mode according to the first control instruction and the data of at least one sensor of the second sensor group; and
a third subunit configured to update the autonomous driving system according to the difference and the driving behavior grade.

In some embodiments, the second subunit may be configured to:
send the first control instruction and the data of the second sensor group to a cloud server; and
receive the driving behavior grade from the cloud server.

In some embodiments, the third subunit may be configured to:
determine a correspondence if the difference is greater than a preset difference threshold and the driving behavior grade is a first grade; and
update a planning and control algorithm of the autonomous driving system according to the correspondence,
wherein the correspondence indicates that the environment sensing information, the positioning information, and the data of the second sensor group correspond to the first control instruction, and wherein the autonomous driving system generates a control instruction for the underlying vehicle execution system in the autonomous driving mode as the first control instruction according to the environment sensing information, the positioning information, the data of the second sensor group and the correspondence.

In some embodiments, the autonomous driving system may further includes a reverse analysis unit configured to:
identify abnormal data in the data of the second sensor group;
to avoid the occurrence of the abnormal data, determine dynamics estimation data and an estimated time corresponding to the dynamics estimation data;
determine a third control instruction for the underlying vehicle execution system according to the dynamics estimation data;
determine, according to the estimated time, historical environment sensing information and historical positioning information generated at the estimated time; and
establish a correspondence indicating that the historical environment sensing information and the historical positioning information correspond to the third control instruction.

The autonomous driving system disclosed in the above embodiments can realize the methods for updating the autonomous driving system disclosed in the above method embodiments, and will not be repeated here to avoid repetition.

It should be noted that in this context, the terms "comprise," "include" or any variation thereof are intended to cover a non-exclusive inclusion, such that a process, method, article, or device that includes a series of elements not only includes those listed elements but also includes other elements not expressly listed or further includes elements inherent to such a process, method, article, or device. Without additional restrictions, an element defined by the phrase "comprising a/an . . . " does not exclude the presence of a further identical element in the process, method, article or device that includes the element.

It can be understood by those skilled in the art that although some embodiments described herein include certain features but not other features included in other embodiments, the combination of features of different embodiments is considered to be within the scope of the present disclosure and form different embodiments.

Although the embodiments of the present disclosure have been is described with reference to the accompanying drawings, various modifications and variations can be made by those skilled in the art without departing from the spirit and scope of the present disclosure, and all such modifications and variations fall within the scope of the present disclosure as defined by the appended claims.

INDUSTRIAL APPLICABILITY

The methods for updating an autonomous driving system, autonomous driving systems and the on-board apparatuses provided by the embodiments of the present disclosure also sense the surrounding environment of a vehicle, perform vehicle positioning, and generate an autonomous control instruction for an underlying vehicle execution system according to environment sensing information, positioning information, and data of vehicle sensors. However, the autonomous driving system does not issue an instruction to control the driving of the vehicle. Instead, it compares the instruction with a control instruction from the driver of the vehicle for the underlying vehicle execution system in the manual driving mode to update a planning and control algorithm of the autonomous driving system. As such, the updated autonomous driving system better caters to the driving habits of the driver and improves driving experience for the driver without compromising the reliability of planning and decision-making of autonomous driving.

The invention claimed is:

1. A method for updating an autonomous driving system, the autonomous driving system issuing no instruction to control the driving of a vehicle in a manual driving mode, the method comprising:
acquiring a first control instruction in the manual driving mode, when a driver drives the vehicle, from an underlying vehicle execution system configured for controlling driving of the vehicle, the first control instruction indicating the driver's driving behavior;
acquiring data of a first sensor group and data of a second sensor group,
the data of the first sensor group including data of the external environment and position data of the vehicle,
the data of the second sensor group including dynamics data of the vehicle;
generating environment sensing information and positioning information according to the data of the first sensor group;
generating a second control instruction for the underlying vehicle execution system in an autonomous driving mode according to the environment sensing information, the positioning information, and the data of the second sensor group, the second control instruction indicating the autonomous driving system's driving algorithm; and
updating the autonomous driving system according to the first control instruction indicating the driver's driving behavior and the second control instruction indicating the autonomous driving system's driving algorithm, wherein updating the autonomous driving system according to the first control instruction and the second control instruction comprises:
determining a difference in control information according to the first control instruction indicting the driver's driving behavior and the second control instruction indicating the autonomous driving system's driving algorithm;

determining a driving behavior grade in the manual driving mode according to the first control instruction indicating the driver's driving behavior and data of at least one sensor of the second sensor group including dynamics data of the vehicle, the driving behavior grade indicating whether the driver's driving behavior is abnormal; and updating the autonomous driving system according to the difference in the control information and the driving behavior grade, wherein the updated autonomous driving system better caters to the driver's driving habits.

2. The method of claim 1, wherein the first sensor group comprises at least one of a camera, a lidar, a millimeter wave radar, a GPS, or an IMU; and wherein the second sensor group comprises at least one of a wheel speed sensor, a speed sensor, an acceleration sensor, or a steering angle sensor.

3. The method of claim 1, wherein determining the driving behavior grade in the manual driving mode according to the first control instruction and the data of at least one sensor of the second sensor group comprises:

sending the first control instruction and the data of the second sensor group to a cloud server; and receiving the driving behavior grade from the cloud server.

4. The method of claim 1, wherein updating the autonomous driving system according to the difference and the driving behavior grade comprises:

determining a correspondence if the difference is greater than a preset difference threshold and the driving behavior grade is a first grade; and updating a planning and control algorithm of the autonomous driving system according to the correspondence, wherein the correspondence indicates that the environment sensing information, the positioning information, and the data of the second sensor group correspond to the first control instruction, and wherein the autonomous driving system generates a control instruction for the underlying vehicle execution system in the autonomous driving mode as the first control instruction according to the environment sensing information, the positioning information, the data of the second sensor group and the correspondence.

5. The method of claim 1, further comprising:

identifying abnormal data in the data of the second sensor group;

determining dynamics estimation data and an estimated time corresponding to the dynamics estimation data;

determining a third control instruction for the underlying vehicle execution system according to the dynamics estimation data;

determining, according to the estimated time, historical environment sensing information and historical positioning information generated at the estimated time; and establishing a correspondence indicating that the historical environment sensing information and the historical positioning information correspond to the third control instruction.

6. An autonomous driving system that issues no instruction to control the driving of a vehicle in a manual driving mode, the autonomous driving system comprising:

a first acquisition unit to acquire a first control instruction in the manual driving mode, when a driver drives the vehicle, from an underlying vehicle execution system configured for controlling driving of the vehicle, the first control instruction indicating the driver's driving behavior;

a second acquisition unit to acquire data of a first sensor group and data of a second sensor group, the data of the first sensor group including data of the external environment and position data of the vehicle, the data of the second sensor group including dynamics data of the vehicle;

a first generation unit to generate environment sensing information and positioning information according to the data of the first sensor group;

a second generation unit to generate a second control instruction for the underlying vehicle execution system in the autonomous driving mode according to the environment sensing information, the positioning information, and the data of the second sensor group, the second control instruction indicating the autonomous driving system's driving algorithm; and an updating unit to update the autonomous driving system according to the first control instruction indicating the driver's driving behavior and the second control instruction indicating the autonomous driving system's driving algorithm, wherein the updating unit comprises:

a first subunit to determine a difference in control information according to the first control instruction indicating the driver's driving behavior and the second control instruction indicating the autonomous driving system's driving algorithm;

a second subunit to determine a driving behavior grade in the manual driving mode according to the first control instruction indicating the driver's driving behavior and data of at least one sensor of the second sensor group including dynamics data of the vehicle, the driving behavior grade indicating whether the driver's driving behavior is abnormal; and a third subunit to update the autonomous driving system according to the difference in control information and the driving behavior grade, wherein the updated autonomous driving system better caters to the driver's driving habits.

7. The autonomous driving system of claim 6, wherein the first sensor group comprises at least one of a camera, a lidar, a millimeter wave radar, a GPS, or an IMU; and wherein the second sensor group comprises at least one of a wheel speed sensor, a speed sensor, an acceleration sensor, or a steering angle sensor.

8. The autonomous driving system of claim 6, wherein the second subunit is to:

send the first control instruction and the data of the second sensor group to a cloud server; and receive the driving behavior grade from the cloud server.

9. The autonomous driving system of claim 6, wherein the third subunit is configured to:

determine a correspondence if the difference is greater than a preset difference threshold and the driving behavior grade is a first grade; and update a planning and control algorithm of the autonomous driving system according to the correspondence, wherein the correspondence indicates that the environment sensing information, the positioning information, and the data of the second sensor group correspond to the first control instruction, and wherein the autonomous driving system generates a control instruction for the underlying vehicle execution system in the autonomous driving mode as the first control instruction according to the environment sensing information, the positioning information, the data of the second sensor group and the correspondence.

10. The autonomous driving system of claim 6, further comprising a reverse analysis unit configured to:
identify abnormal data in the data of the second sensor group;
determine dynamics estimation data and an estimated time corresponding to the dynamics estimation data;
determine a third control instruction for the underlying vehicle execution system according to the dynamics estimation data;
determine, according to the estimated time, historical environment sensing information and historical positioning information generated at the estimated time; and
establish a correspondence indicating that the historical environment sensing information and the historical positioning information correspond to the third control instruction.

11. An apparatus, comprising:
a processor, a memory and a communication interface,
wherein the processor, the memory, and the communication interface are coupled to one another through a bus system; and
wherein, when executing a computer program stored in the memory, the processor is to:
acquire a first control instruction in a manual driving mode, when a driver drives the vehicle, from an underlying vehicle execution system configured for controlling driving of the vehicle, the first control instruction indicating the driver's driving behavior;
acquire data of a first sensor group and data of a second sensor group,
the data of the first sensor group including data of the external environment and position data of the vehicle,
the data of the second sensor group including dynamics data of the vehicle;
generate environment sensing information and positioning information according to the data of the first sensor group;
generate a second control instruction for the underlying vehicle execution system in the autonomous driving mode according to the environment sensing information, the positioning information, and the data of the second sensor group, the second control instruction indicating the autonomous driving system's driving algorithm; and
update the autonomous driving system according to the first control instruction and the second control instruction,
wherein, to update the autonomous driving system according to the first control instruction indicating the driver's driving behavior and the second control instruction indicating the autonomous driving system's driving algorithm, the processor is further to:
determine a difference in control information according to the first control instruction indicating the driver's driving behavior and the second control instruction indicating the autonomous driving system's driving algorithm;
determine a driving behavior grade in the manual driving mode according to the first control instruction indicating the driver's driving behavior and data of at least one sensor of the second sensor group including dynamics data of the vehicle, the driving behavior grade indicating whether the driver's driving behavior is abnormal; and
update the autonomous driving system according to the difference in control information and the driving behavior grade,
wherein the updated autonomous driving system better caters to the driver's driving habits.

12. The apparatus of claim 11, wherein the first sensor group comprises at least one of a camera, a lidar, a millimeter wave radar, a GPS, or an IMU; and wherein the second sensor group comprises at least one of a wheel speed sensor, a speed sensor, an acceleration sensor, or a steering angle sensor.

13. The apparatus of claim 11, wherein, to determine the driving behavior grade in the manual driving mode according to the first control instruction and the data of at least one sensor of the second sensor group, the processor is further to:
send the first control instruction and the data of the second sensor group to a cloud server; and
receive the driving behavior grade from the cloud server.

14. The apparatus of claim 11, wherein, to update the autonomous driving system according to the difference and the driving behavior grade, the processor is further to:
determine a correspondence if the difference is greater than a preset difference threshold and the driving behavior grade is a first grade; and
update a planning and control algorithm of the autonomous driving system according to the correspondence, wherein the correspondence indicates that the environment sensing information, the positioning information, and the data of the second sensor group correspond to the first control instruction, and
wherein the autonomous driving system generates a control instruction for the underlying vehicle execution system in the autonomous driving mode as the first control instruction according to the environment sensing information, the positioning information, the data of the second sensor group and the correspondence.

15. The apparatus of claim 11, further the processor is further to:
identify abnormal data in the data of the second sensor group;
determine dynamics estimation data and an estimated time corresponding to the dynamics estimation data;
determine a third control instruction for the underlying vehicle execution system according to the dynamics estimation data;
determine, according to the estimated time, historical environment sensing information and historical positioning information generated at the estimated time; and
establish a correspondence indicating that the historical environment sensing information and the historical positioning information correspond to the third control instruction.

* * * * *